(No Model.)
C. D. ADAMS.
TWO WHEELED VEHICLE.
No. 317,271. Patented May 5, 1885.
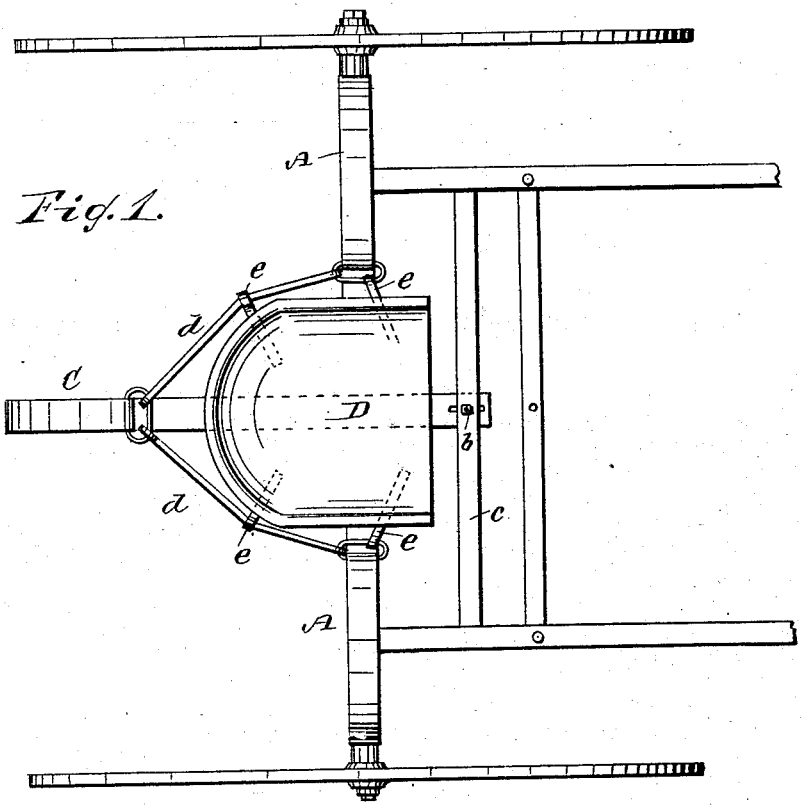
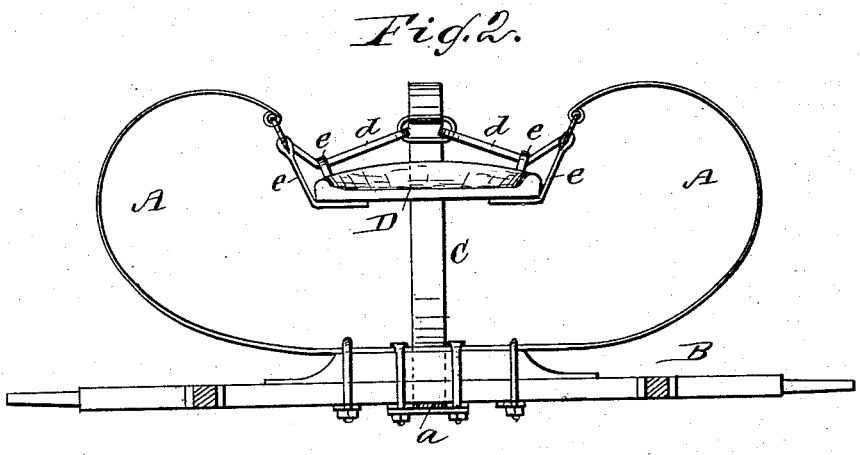
WITNESSES:
Theo. G. Hoster
C. Sedgwick
INVENTOR:
C. D. Adams
BY Munn & Co.
ATTORNEYS.

UNITED STATES PATENT OFFICE.

CHARLES D. ADAMS, OF GENEVA, GEORGIA.

TWO-WHEELED VEHICLE.

SPECIFICATION forming part of Letters Patent No. 317,271, dated May 5, 1885.

Application filed December 8, 1884. (No model.)

*To all whom it may concern:*

Be it known that I, CHARLES D. ADAMS, of Geneva, in the county of Talbot and State of Georgia, have invented a new and Improved Spring-Gear for Road-Carts or Sulkies, of which the following is a full, clear, and exact description.

My improvement relates to two-wheeled vehicles, and has the object to render vehicles of that class easy-riding, safe, and durable.

To those ends the invention consists in spring-gear of novel construction and arrangement, as hereinafter described and claimed.

Reference is to be had to the accompanying drawings, forming a part of this specification, in which similar letters of reference indicate corresponding parts in both the figures.

Figure 1 is a plan view of a sulky with my improvement, and Fig. 2 is a front view of the axle and springs.

A A are the side springs on axle B. C is the back spring, and D the seat suspended from the ends of the springs. The side springs, A, are formed by a bar of steel clipped lengthwise of the axle at its mid-length, with the ends bent upward and inward in C form. The back spring, C, is of the same form; but its straight portion is longer, and is attached across and beneath the axle by a clip, $a$, with its end extending forward to a cross-bar, $c$, where it is attached by a bolt, $b$, passing through a slot in the spring, so that spring can be lengthened and shortened, as may be required. The upper ends of the springs A C are provided with loops and connected by straps $d$, and the seat is hung thereon by tugs $e$.

It is to be observed that the bearings of these springs are at the center of the axle, and the front of the seat is supported by the two springs, that have motion in a plane parallel to the axle, and not with the motion given by the horse. The back spring, C, absorbs the motion of the horse, and the suspension-tugs $e$ of the seat being about midway between the springs, the motion of the seat will be vertical, and not affected by side jerks.

This vehicle is light, cheap, and durable, and less liable to turn over than those with common gear.

Two back springs may be used in place of one, if preferred.

Having thus described my invention, I claim as new and desire to secure by Letters Patent—

1. The spring-gear for vehicles, consisting of the side springs, A, curved in C form above the axle, and the back spring, C, attached crosswise of the axle, the seat being suspended between the upper ends of the springs, substantially as described.

2. In a two-wheeled vehicle, the combination of the springs A A and C, attached at the middle of the axle, the seat D, straps $d$, and tugs $e$, substantially as described.

3. The adjustable back spring, C, combined with side springs, A, axle B, and seat D, substantially as described.

CHARLES D. ADAMS.

Witnesses:
JESSE J. BUEL,
JNO. W. HALL.